United States Patent
Matusik et al.

(10) Patent No.: US 10,994,477 B1
(45) Date of Patent: May 4, 2021

(54) OPTICAL SCANNING FOR INDUSTRIAL METROLOGY

(71) Applicant: Inkbit, LLC, Medford, MA (US)

(72) Inventors: Wojciech Matusik, Lexington, MA (US); Gregory Ellson, Cambridge, MA (US); Desai Chen, Arlington, MA (US); Javier Ramos, Brookline, MA (US); Davide Marini, Medford, MA (US); Aaron Weber, Arlington, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 16/671,234

(22) Filed: Nov. 1, 2019

(51) Int. Cl.
| | |
|---|---|
| *B29C 64/135* | (2017.01) |
| *B29C 64/205* | (2017.01) |
| *G02B 26/10* | (2006.01) |
| *B33Y 30/00* | (2015.01) |
| *B33Y 70/00* | (2020.01) |
| *B33Y 10/00* | (2015.01) |

(52) U.S. Cl.
CPC .......... *B29C 64/135* (2017.08); *B29C 64/205* (2017.08); *B29K 2995/0027* (2013.01); *B29K 2995/0035* (2013.01); *B33Y 10/00* (2014.12); *B33Y 30/00* (2014.12); *B33Y 70/00* (2014.12); *G02B 26/10* (2013.01)

(58) Field of Classification Search
CPC ... B29C 64/386; B29C 64/393; B29C 64/112; B33Y 10/00; B33Y 30/00; B33Y 70/00
See application file for complete search history.

(56) References Cited

U.S. PATENT DOCUMENTS

| | | | |
|---|---|---|---|
| 5,460,758 A | * | 10/1995 | Langer .................. G03F 7/0037 264/401 |
| 6,492,651 B2 | | 12/2002 | Kerekes |
| 9,562,759 B2 | | 2/2017 | Vogler et al. |
| 9,952,506 B2 | | 4/2018 | Arai et al. |
| 10,011,071 B2 | | 7/2018 | Batchelder |
| 10,252,466 B2 | | 4/2019 | Ramos et al. |

(Continued)

FOREIGN PATENT DOCUMENTS

| | | |
|---|---|---|
| EP | 3459716 A1 | 3/2019 |
| JP | 2014098555 A | 5/2014 |

(Continued)

OTHER PUBLICATIONS

Kulik, Eduard A., and Patrick Calahan. "Laser profilometry of polymeric materials." Cells and Materials 7, No. 2 (1997): 3.

(Continued)

*Primary Examiner* — Galen H Hauth
(74) *Attorney, Agent, or Firm* — Occhiuti & Rohlicek LLP

(57) ABSTRACT

An approach to improving optical scanning increases the strength of optical reflection from the build material during fabrication. In some examples, the approach makes use of an additive (or a combination of multiple additives) that increases the received signal strength and/or improves the received signal-to-noise ratio in optical scanning for industrial metrology. Elements not naturally present in the material are introduced in the additives in order to increase fluorescence, scattering or luminescence. Such additives may include one or more of: small molecules, polymers, peptides, proteins, metal or semiconductive nanoparticles, and silicate nanoparticles.

28 Claims, 5 Drawing Sheets

(56) References Cited

U.S. PATENT DOCUMENTS

| | | | |
|---|---|---|---|
| 10,456,984 B2 | 10/2019 | Matusik et al. | |
| 2002/0104973 A1* | 8/2002 | Kerekes | B33Y 10/00 |
| | | | 250/559.2 |
| 2004/0173946 A1 | 9/2004 | Pfeifer et al. | |
| 2007/0106172 A1 | 5/2007 | Abreu | |
| 2007/0241482 A1* | 10/2007 | Giller | G03G 15/224 |
| | | | 264/494 |
| 2008/0124475 A1 | 5/2008 | Kritchman | |
| 2009/0073407 A1 | 3/2009 | Okita | |
| 2009/0105605 A1 | 4/2009 | Abreu | |
| 2009/0220895 A1* | 9/2009 | Garza | H01L 22/12 |
| | | | 430/322 |
| 2009/0279089 A1 | 11/2009 | Wang | |
| 2009/0279098 A1 | 11/2009 | Ohbayashi et al. | |
| 2010/0140550 A1 | 6/2010 | Keller et al. | |
| 2010/0158332 A1 | 6/2010 | Rico et al. | |
| 2012/0275148 A1* | 11/2012 | Yeh | G02B 5/208 |
| | | | 362/235 |
| 2013/0182260 A1 | 7/2013 | Bonnema et al. | |
| 2014/0249663 A1 | 9/2014 | Voillaume | |
| 2014/0300676 A1 | 10/2014 | Miller et al. | |
| 2015/0061178 A1 | 3/2015 | Siniscalchi et al. | |
| 2015/0101134 A1 | 4/2015 | Manz et al. | |
| 2015/0352792 A1 | 12/2015 | Kanada | |
| 2016/0018404 A1* | 1/2016 | Iyer | G01N 33/552 |
| | | | 424/9.6 |
| 2016/0023403 A1* | 1/2016 | Ramos | B33Y 50/02 |
| | | | 264/40.1 |
| 2016/0157751 A1 | 6/2016 | Mahfouz | |
| 2016/0167301 A1 | 6/2016 | Cole et al. | |
| 2016/0209319 A1 | 7/2016 | Adalsteinsson et al. | |
| 2016/0249836 A1 | 9/2016 | Gulati et al. | |
| 2016/0320771 A1 | 11/2016 | Huang | |
| 2016/0347005 A1* | 12/2016 | Miller | B33Y 30/00 |
| 2017/0021455 A1 | 1/2017 | Dallarosa et al. | |
| 2017/0106604 A1 | 4/2017 | Dikovsky et al. | |
| 2017/0120337 A1 | 5/2017 | Kanko et al. | |
| 2017/0143494 A1 | 5/2017 | Mahfouz | |
| 2017/0217103 A1 | 8/2017 | Babaei et al. | |
| 2017/0355147 A1 | 12/2017 | Buller et al. | |
| 2018/0017501 A1 | 1/2018 | Trenholm et al. | |
| 2018/0056582 A1 | 3/2018 | Matusik et al. | |
| 2018/0071984 A1 | 3/2018 | Lee et al. | |
| 2018/0099333 A1 | 4/2018 | DehghanNiri et al. | |
| 2018/0143147 A1 | 5/2018 | Milner et al. | |
| 2018/0169953 A1 | 6/2018 | Matusik et al. | |
| 2018/0194066 A1 | 7/2018 | Ramos et al. | |
| 2018/0273657 A1 | 9/2018 | Wang et al. | |
| 2018/0281067 A1 | 10/2018 | Small et al. | |
| 2018/0297113 A1 | 10/2018 | Preston et al. | |
| 2018/0304549 A1* | 10/2018 | Safai | B29C 64/386 |
| 2018/0311893 A1 | 11/2018 | Choi et al. | |
| 2018/0320006 A1 | 11/2018 | Lee et al. | |
| 2018/0341248 A1 | 11/2018 | Mehr et al. | |
| 2018/0348492 A1 | 12/2018 | Pavlov et al. | |
| 2019/0077921 A1 | 3/2019 | Eckel | |
| 2019/0271966 A1 | 9/2019 | Coffman et al. | |
| 2019/0322031 A1 | 10/2019 | Kritchman | |
| 2019/0329322 A1 | 10/2019 | Preston et al. | |
| 2019/0346830 A1 | 11/2019 | de Souza Borges Ferreira et al. | |
| 2019/0353767 A1 | 11/2019 | Eberspach et al. | |
| 2020/0143006 A1 | 5/2020 | Matusik et al. | |
| 2020/0147888 A1 | 5/2020 | Ramos et al. | |
| 2020/0215761 A1 | 7/2020 | Chen et al. | |

FOREIGN PATENT DOCUMENTS

| | | |
|---|---|---|
| JP | 6220476 B1 | 10/2017 |
| JP | 2018103488 A | 7/2018 |
| KR | 101567281 B1 | 11/2015 |
| KR | 20180067961 A | 6/2018 |
| WO | 2003/026876 A2 | 4/2003 |
| WO | 2017066077 A1 | 4/2017 |
| WO | 2018080397 A1 | 5/2018 |
| WO | 2018197376 A1 | 11/2018 |
| WO | 2018209438 A1 | 11/2018 |
| WO | 2019070644 A2 | 4/2019 |
| WO | 2019125970 A1 | 6/2019 |
| WO | 2020123479 A1 | 6/2020 |

OTHER PUBLICATIONS

Alarousu, Erkki, Ahmed AlSaggaf, and Ghassan E. Jabbour. "Online monitoring of printed electronics by spectral-domain optical coherence tomography." Scientific reports 3 (2013): 1562.

Daniel Markl et al: "Automated pharmaceutical tablet coating layer evaluation of optical coherence tomography images", Measurement Science and Technology, IOP, Bristol, GB, vol. 26, No. 3, Feb. 2, 2015 (Feb. 2, 2015), p. 35701, XP020281675, ISSN: 0957-0233, DOI: 10.1088/0957-0233/26/3/035701 [retrieved on Feb. 2, 2015].

Daniel Markl et al: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL ISSN: 0143-8166, DOI: 10.1016/j.optlaseng.2014.02.008.

Fischer, Björn, Christian Wolf, and Thomas Härtling. "Large field optical tomography system." In Smart Sensor Phenomena, Technology, Networks, and Systems Integration 2013, vol. 8693, p. 86930P. International Society for Optics and Photonics, 2013.

Huo, Tiancheng, Chengming Wang, Xiao Zhang, Tianyuan Chen, Wenchao Liao, Wenxin Zhang, Shengnan Ai, Jui-Cheng Hsieh, and Ping Xue. "Ultrahigh-speed optical coherence tomography utilizing all-optical 40 MHz swept-source." Journal of biomedical optics 20, No. 3 (2015): 030503.

Klein, Thomas, and Robert Huber. "High-speed OCT light sources and systems." Biomedical optics express 8, No. 2 (2017): 828-859.

Moon, Sucbei, and Dug Young Kim. "Ultra-high-speed optical coherence tomography with a stretched pulse supercontinuum source." Optics Express 14, No. 24 (2006): 11575-11584.

Park, Yongwoo, Tae-Jung Ahn, Jean-Claude Kieffer, and José Azaña. "Optical frequency domain reflectometry based on real-time Fourier transformation." Optics express 15, No. 8 (2007): 4597-4616.

Wieser, Wolfgang, Benjamin R. Biedermann, Thomas Klein, Christoph M. Eigenwillig, and Robert Huber. "Multi-megahertz OCT: High quality 3D imaging at 20 million A-scans and 4.5 GVoxels per second." Optics express 18, No. 14 (2010): 14685-14704.

Xu, Jingjiang, Xiaoming Wei, Luoqin Yu, Chi Zhang, Jianbing Xu, K. K. Y. Wong, and Kevin K. Tsia. "Performance of megahertz amplified optical time-stretch optical coherence tomography (AOT-OCT)." Optics express 22, No. 19 (2014): 22498-22512.

Zhou, Chao, Aneesh Alex, Janarthanan Rasakanthan, and Yutao Ma. "Space-division multiplexing optical coherence tomography." Optics express 21, No. 16 (2013): 19219-19227.

Blanken, Lennart, Robin de Rozario, Jurgen van Zundert, Sjirk Koekebakker, Maarten Steinbuch, and Tom Oomen. "Advanced feedforward and learning control for mechatronic systems." In Proc. 3rd DSPE Conf. Prec. Mech, pp. 79-86. 2016.

Blanken Lennart. "Learning and repetitive control for complex systems: with application to large format printers." (2019).

Oomen, Tom. "Advanced motion control for next-generation precision mechatronics: Challenges for control, identification, and learning." In IEEJ International Workshop on Sensing, Actuation, Motion Control, and Optimization (SAMCON), pp. 1-12. 2017.

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.

Qi, X.; Chen, G.; Li, Y.; Cheng, X.; and Li, C., "Applying Neural-Network Based Machine Learning to Additive Manufacturing: Current Applications, Challenges, and Future Perspectives", Jul. 29, 2018, Engineering 5 (2019) 721-729. (Year: 2019).

DebRoy, T.; Wei, H.L.; Zuback, J.S.; Muhkerjee, T.; Elmer, J.W.; Milewski, J.O.; Beese, A.M.; Wilson-Heid, A.; Ded, A.; and Zhang, W., "Additive manufacturing of metallic components—Process,

(56) References Cited

OTHER PUBLICATIONS structure and properties", Jul. 3, 2017, Progress in Materials Science 92 (2018) 112-224. (Year: 2017).
International Search Report dated Jul. 21, 2020 in PCT Application No. PCT/US2019/059300.

* cited by examiner

OPTICAL SCANNING FOR INDUSTRIAL METROLOGY

BACKGROUND

This application relates to optical scanning for industrial metrology, and more particularly to material properties to improve optical scanning during three-dimensional printing.

Transparent substrates are difficult to reliably scan using laser profilometry due to the laser beam being absorbed in or passing through the sample. This reduces the amount of light reflected or scattered by the sample, thereby reducing the signal available to the sensor element. If insufficient light from the surface reaches the sensor, the scanner may not produce an accurate depth map of the surface. This is particularly common in polymeric materials, many of which are fully or partially transparent or translucent to the laser wavelengths used in commercial profilometer systems.

Additive manufacturing refers to a set of methods that allows objects to be fabricated via selective addition of material. A typical additive manufacturing process works by slicing a digital model (for example, represented using an STL file) into a series of layers. Then the layers are sent to a fabrication apparatus that deposits the layers one by one from the bottom to the top. Additive manufacturing is rapidly gaining popularity in a variety of markets including automotive, aerospace, medical devices, pharmaceuticals, and industrial tooling.

The growth of additive manufacturing processes has led to various iterations of such processes being commercialized, including extrusion processes, such as fused deposition Modeling® (FDM®), light polymerization processes, such as stereolithography (SLA) and multijet/polyjet, powder bed fusion processes, such as selective laser sintering (SLS) or binder jetting, and lamination processes, such as laminated object manufacturing (LOM). Nevertheless, despite this growth and rapid progress, additive manufacturing has limitations, such as the materials that can be used in conjunction with such processes. There are limited types of materials, and the performance of the materials limit the efficiency and quality that results.

Inkjet 3D printing is a method of additive manufacturing where printheads deposit droplets of liquid printable resins. Printheads are typically mounted on a gantry system to allow deposition of printable resins in different locations of the build volume. The build platform may also move with respect to the printheads, which may be stationary. The liquid printable resin is solidified using UV or visible-light radiation.

Multiple printheads can be used in one system in order to build objects with multiple base materials. For example, materials that have different optical, mechanical, thermal, electromagnetic properties can be used. These materials can be combined to achieve composite materials with a wide range of material properties.

The UV curing unit is typically one of the subsystems used within an inkjet additive manufacturing apparatus. UV radiation provides the means of solidifying printable resins via photo-initiation of the polymerization reaction. UV radiation can be supplied by a variety of different mechanisms such as arrays of LEDs and Mercury or Xenon arc lamps. UV curing is typically applied after each printed layer or after depositing each material within a layer. The UV curing unit can be fixed with respect to the printer or it can move independently with respect to the object.

Alternatively, printable resin solidification can be achieved by changes in thermal conditions. For example, a liquid material solidifies as its temperature is lowered. A variety of different printable resins can be used in this category, such as waxes. Both UV-phase change and thermal-phase change printable resins can be combined to manufacture an object.

3D printed objects when manufactured using an inkjet process may need structural support. For example, most objects with overhangs need support structures. Typically, additional print data is generated for these support structures. In inkjet additive manufacturing, typically a separate printable resin is designated as a support material. This printable resin is deposited also using printheads and solidified. It is desirable for the support material to be easily removed after the print is completed. There are many potential support materials including UV-curable materials that are soluble in water or other solvents or wax based materials that can be removed by melting.

After the printing process is completed, parts are typically post-processed. For example, support material may need to be removed. The parts might also need to be post-processed to improve their mechanical or thermal properties. This may include thermal treatment and/or additional UV exposure.

Printable resins suitable for inkjet printing need to conform to certain specifications. The key requirements include: 1) viscosity typically needs to be within 3-15 cps at the operating conditions; 2) surface tension typically should be between 20-45 mN/m; 3) thermal stability—the printable resin should not solidify within the printhead, printable resin container, or feeding system; 4) formulation stability—different components of the printable resin should not separate for a reasonably long time. Printable resins are typically optimized in order to meet the specifications for printing.

Furthermore, the waveform for driving the printheads must be optimized and adapted for each printable resin. Moreover, many different parameters of the printing process need to be adapted for individual printable resins, such as printhead and printable resin pre-heating In many cases printable resins may include additives. These additives include colorants in the form of dyes or pigments or the mixture of pigments and dyes that are dispersed or dissolved in the printable resin. Surfactants may also be used to adjust the surface tension of the printable resin for improved jetting or printing performance. In addition, other types of particles or additives may be used in order to enhance the mechanical, thermal or optical characteristics of the cured resin.

Laser profilometry is a testing method used to scan and map the surface of an object. In this method, a laser is rastered across the surface of the object (see, e.g., Kulik, Eduard A., and Patrick Calahan. "Laser profilometry of polymeric materials." *Cells and Materials* 7, no. 2 (1997): 3). The surface reflects the laser signal, which is detected by a sensor. The surface location can then be calculated using the known position and orientation of the laser source and sensor. This can be a highly precise and accurate measurement method, capable of producing surface maps with sub-micron detail.

Typical methods of improving signal quality in polymeric samples for laser profilometry are to coat the sample surface with a reflective substrate such as gold or to apply high degrees of filtering to the signal data. Coated substrates produce high quality signals, but this method is not feasible for cases where thousands of scans can be performed while a part is 3D printed. Signal processing can improve the scan quality, but the corrections are often material-specific and are difficult to apply to multi-material substrates.

SUMMARY

In a general aspect, an approach to improving optical scanning causes or increases the strength of or otherwise affects the characteristics (e.g., strength, spectral content, etc.) of optical (or other electromagnetic) emission from a material during additive fabrication. An "emission" of a signal from the material means any form of propagation of the signal (i.e., electromagnetic radiation), whether resulting from, without limitation, reflection or scattering of a signal in the material, from attenuation of a signal passing through the material, from fluorescence or luminescence within the material, or from a combination of such effects, and "scanning" the emitted signal means any form of sensing and/or processing of the propagated signal. In some examples, the approach makes use of an additive (or a combination of multiple additives) that causes optical emission or increases the received signal strength and/or improves the received signal-to-noise ratio in optical scanning for industrial metrology. Elements not naturally present in the material used for fabrication are introduced in the additives in order to increase fluorescence, scattering or luminescence. Such additives may include one or more of: small molecules, polymers, peptides, proteins, metal or semiconductive nanoparticles, and silicate nanoparticles.

In one aspect, in general, a method for additive manufacturing includes forming an object by depositing a material in an additive fabrication process. The material that is deposited includes a build material component and an optical enhancement component. The object is scanned. As part of the scanning, an optical signal is caused to be emitted from the object, wherein the emission of the optical signal is caused at least in part by an emission from the optical enhancement component. The scanning includes sensing the emission of the optical signal and determining at least one property of the object from the scanning of the emission.

In another aspect, in general, a three-dimensional printing system includes a material deposition subsystem configured to controllably deposit a material in a liquid state to form an object. The material includes a build material component and an optical enhancement component. A scanning system configured causing emission of an optical signal from the object, where the emission of the optical signal is caused at least in part by interaction of an excitation signal with the optical enhancement component in the object. The scanning system is further configured to sense the emission of the optical signal, and to determine at least one property of the object from the scanning of the emission. A controller configured to control further material deposition by the material deposition subsystem according to the determined at least one property of the object.

In another aspect, in general, a liquid material for use in three-dimensional additive fabrication includes a build material component, and an optical enhancement component.

Aspects can include one or more of the following features.

The emission of the optical signal is caused at least in part by interaction of an excitation signal with the optical enhancement component in the object.

The emission of the optical signal is caused at least in part by a transient chemical process.

The scanning of the object includes using a laser profilometry technique.

The method further includes controlling further depositing of the material on the object according to the determined at least one property of the object, for instance in a feedback arrangement.

Causing the emission includes causing scatter of an incident optical signal from the optical enhancement material component.

Causing the emission includes causing photoluminescence from the optical enhancement material component resulting from excitation by an incident signal.

Forming the object includes deposition of multiple difference materials, each material including a different optical enhancement component (or combination of such components).

Scanning the objects includes distinguishing materials according to different emission characteristics (e.g., spectra) of the different optical enhancement components.

Determining the at least one property of the object includes determining a surface profile of the object.

Determining the at least one property of the object includes determining a material transition in the object.

Determining the at least one property of the object includes determining a material concentration in the object.

The method further includes selecting a concentration of the optical enhancement component in the material.

The material has less than 1% optical enhancement component by weight, or more particularly, the material has less than 0.1% optical enhancement component by weight.

The build material component comprises ultra-violet or visible light curable resin.

The optical enhancement component absorbs and fluoresces light at 405 nm.

The optical enhancement component comprises a material of a stillbene class.

The optical enhancement component comprises 2,2'-(2,5-thiophenediyl)bis(5-tert-butylbenzoxazole)

The optical enhancement component comprises a material of a thiophene class

The optical enhancement component comprises 2,2'-(1,2-ethenediyl)bis(4,1-phenylene)bisbenzoxazole The build material comprises an ultra-violet or visible light curable or heat curable (thermoset) resin.

The optical enhancement component, after use in fabrication of an object, emits an optical signal from the objects caused by excitation by an incident signal on the object.

The optical enhancement component emits the optical signal by scattering an incident signal.

The optical enhancement component emits the optical signal by photoluminescence excited by an incident signal.

Other features and advantages of the invention are apparent from the following description, and from the claims.

DESCRIPTION

Figure 1:
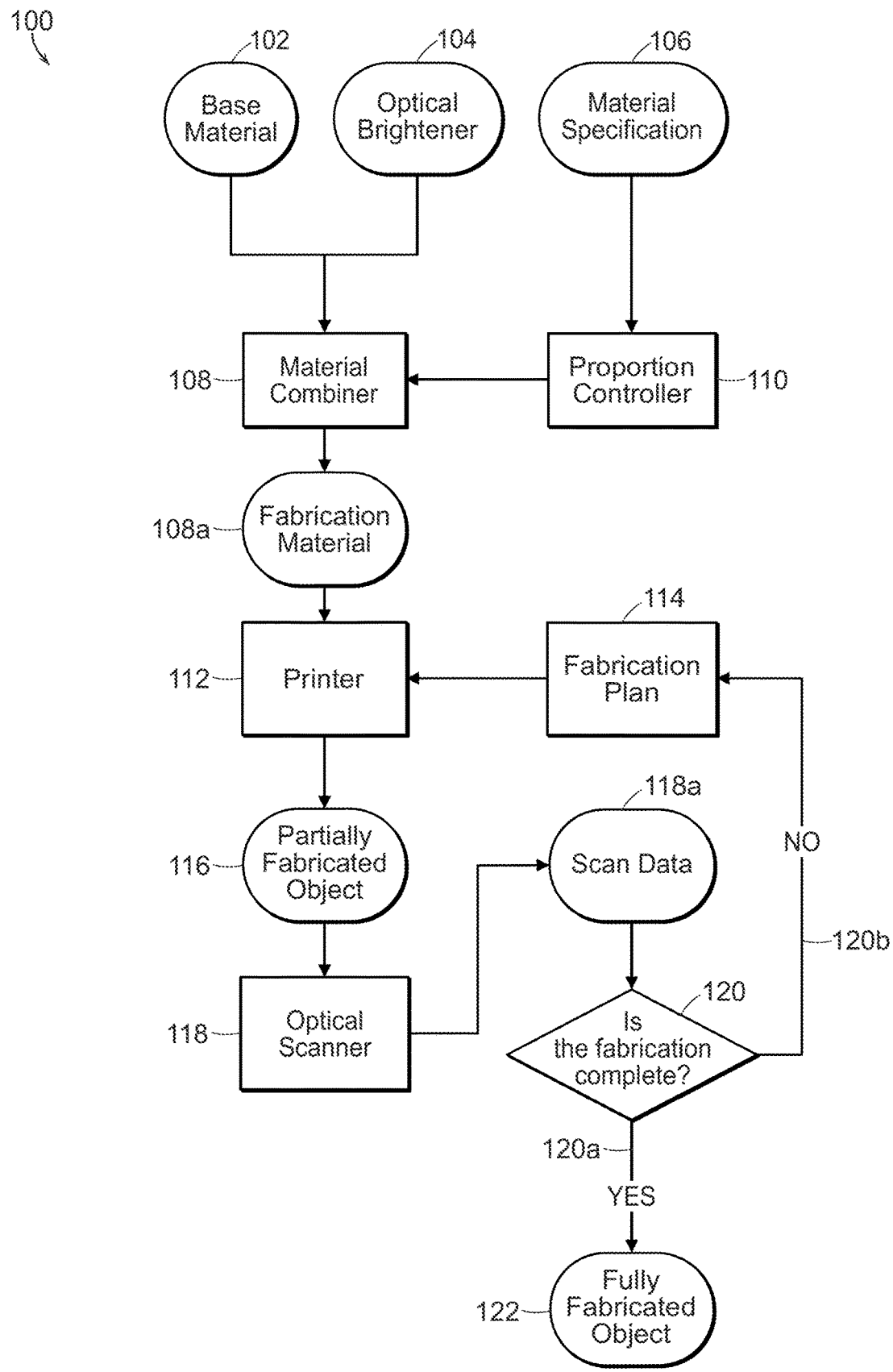
FIG. 1 is a diagram that illustrates a process for additive manufacturing that utilizes an optical brightener material.

Applications of scanning improvements described below include three-dimensional additive fabrication in an optical scanning feedback approach in which during fabrication, the achieved properties of a partially fabricated object are scanned, and information gained from that scanning is used to modify further addition of material so that the object matches the desired characteristics, for instance in dimension or composition. The scanning can be used in various physical arrangements, including in printing arrangements described in U.S. Pat. No. 10,252,466, titled "SYSTEMS AND METHODS OF MACHINE VISION ASSISTED ADDITIVE FABRICATION," and U.S. Pat. Pub. US2018/0169953A1, titled "ADAPTIVE MATERIAL DEPOSITION FOR ADDITIVE MANUFACTURING," which are incorporated herein by reference. Although certain examples described in these documents make use of Optical Coherence Tomography (OCT) for scanning the surface of objects under manufacture, improvements described below are not necessarily directed to techniques requiring coherent reflection from objects. For example, the OCT-based scanning may be replaced with techniques that rely on detection of the point or points at which a scanning signal impinges on an object being manufactured to determine the surface shape of the object. Such techniques rely on an illuminated point emitting light, for example, due to reflection, scattering, photoluminescence, or fluorescence. A number of different types of scanning techniques may make use of such emission, including laser profilometry (e.g., using confocal or geometric approaches), or structured light scanning (e.g., projection methods using incoherent light). In general, in some such techniques, the object is illuminated or otherwise excited with electromagnetic radiation (e.g., light or radio frequency radiation) from one position, and the emissions are detected or imaged from another location, and the geometric relationship of the positions is used to compute the coordinates of the point at which the object is illuminated and therefore the point from which the emission originates. The description below may focus on laser profilometry, however it should be understood that the improvements are applicable more broadly to other scanning approaches.

In a first application, a laser profilometry approach is used to determine the depth (i.e., the amount of material deposited) during the manufacturing of an object by sensing the locations of points on the surface of the object. In this application, very generally, a base fabrication material (a "build material component") is modified before use by incorporating an additive (an "optical enhancement component") into the material that changes the properties of the optical emission during fabrication. For example, the additive may increase the scattering of light from the material and/or cause fluorescence when excited. The additive may be incorporated at the time of printing (generally as described below), or may be incorporated much earlier, for example at the time that the fabrication material is prepared and stored for later use in fabrication.

Referring to FIG. 1, an additive manufacturing process 100 makes use of a base material 102 and an optical brightener 104 (or more generally multiple different base materials, for example, with different physical properties and/or multiple different optical brighteners, for example, with different optical emission properties) to produce an object 116 according to a fabrication plan 114, which specifies the geometric shape of the object. A printer 112 iteratively adds material to a partially fabricated object 116 until, according to the fabrication plan 114, the fabrication is complete and the process 100 yields the fully fabricated object.

Further referring to FIG. 1, generally speaking, the process makes use of an optical sensing closed-loop feedback control in which an optical scanner is used to generate scan data 118, which represents the surface of the object 116 under fabrication. The printer 112 uses the fabrication plan 114 in combination with the scan data 118a to control the printing process, for example, to compensate for manufacturing variability.

Very generally, in order to enhance the performance of the optical scanner 118, and to have the scan data 118a accurately represent the partially fabricated object 116, the printer uses an enhanced fabrication material 108a. Further referring to FIG. 1, the additive manufacturing process is configured to make use of a combination of a base material 102 and an optical brightener 104 or a combination of optical brighteners. In the configuration shown in FIG. 1, a material combiner 108 is configured to receive as input and combine materials, in particular the base material 102 and the optical brightener 104, for use in the additive manufacturing process 100. In some embodiments, the material combiner may be configured to receive more materials than just a base material 102 and an optical brightener 104, for example, combining materials that react during the fabrication process. In some embodiments, the material combiner 108 receives input from a proportion controller 110, which outputs a control signal instructing the material combiner 108 with the proportion of which to combine the base material 102 and the optical brightener 104. In some embodiments, the proportion of the optical brightener 104 in the combination of base material 102 and optical brightener is greater than 0% and less than 1%. The output provided by the proportion controller 110 that instructs the material combiner 108 with what proportion at which to mix the received base material 102 and optical brightener 104 is determined by the material specification 106. The material specification is a characterization of the desired material composition to be used in the additive fabrication process 100. This material specification 106, once received as input at the proportion controller 110, is then used by the proportion controller 110 to determine its material ratio output.

Further referring to FIG. 1, the material combiner 108 provides a fabrication material to the printer 112. The fabrication material 108a output from the material combiner 108 is a combination of the base material 102 and the optical brightener 104 combined in a ratio ultimately dictated by the material specification 106. The printer 112 proceeds to deposit the fabrication material 108a according to the fabrication plan 114 to produce a partially fabricated object 116. For an initial deposition, the printer may deposit the fabrication material on a build surface; further layers of the fabrication material are deposited on layers that were previously deposited in the fabrication process. The partially fabricated object 116 is scanned by an optical scanner 118 in a feedback arrangement to control further depositing of material in the fabrication process and to determine whether the fabrication has been completed based on the fabrication plan, represented via scan data 118a. In some embodiments, the optical scanner 118 scans the partially fabricated object 116 continuously and provides a determination 120 regarding whether the fabrication has completed. In some further embodiments, the optical scanner scans the partially fabricated object periodically and provides discrete determinations 120 as to whether the fabrication process has completed.

Figure 2A:
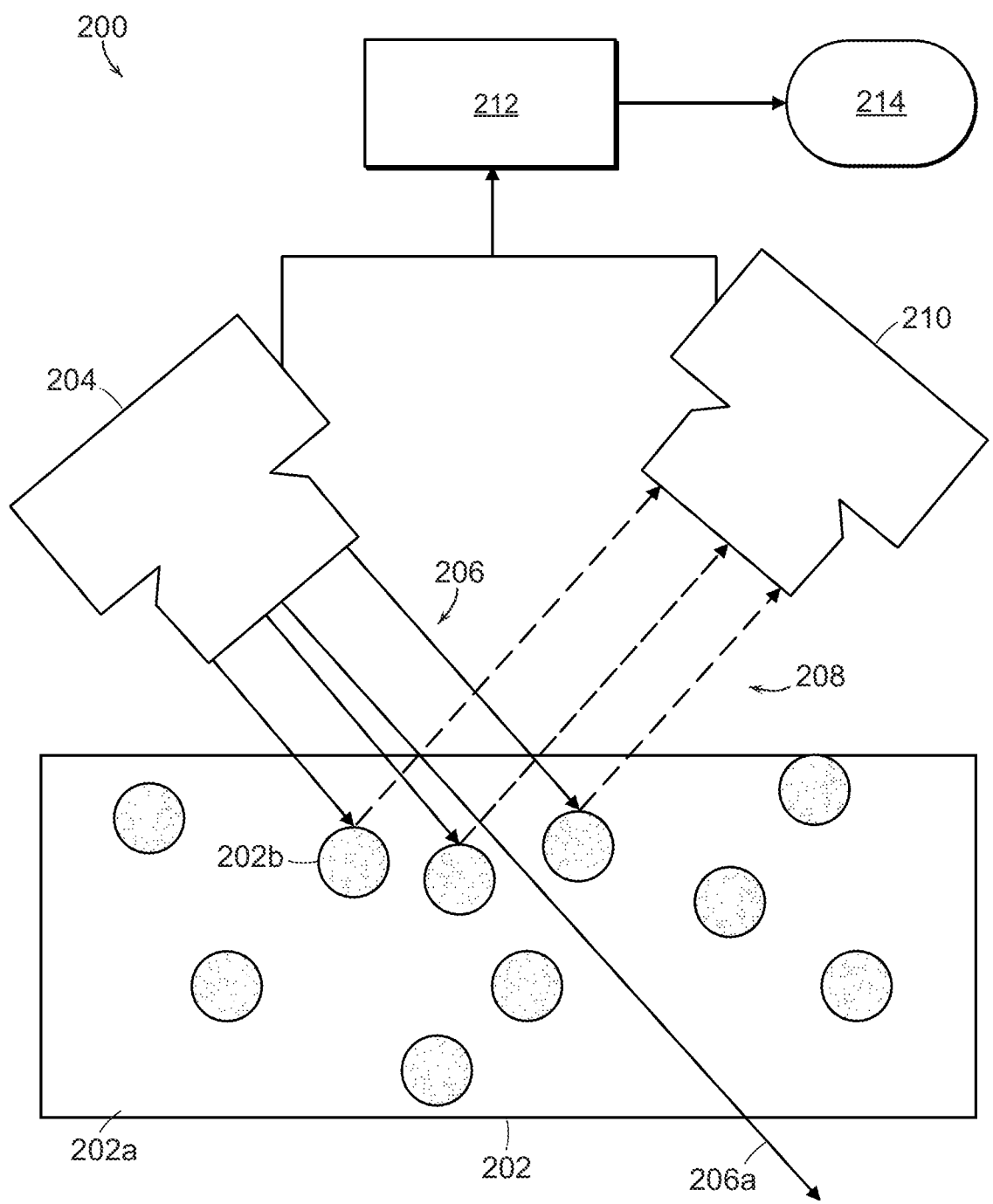
FIGS. 2A and 2B are two views that illustrate an optical scanner in the process of scanning a material containing an optical brightener.

Referring to FIG. 2A, an optical scanner 200 is (e.g., suitable to be used as optical scanner 118 in FIG. 1) includes an optical source 204, which is configured to emit an optical signal 206, an optical receiver 210, which is configured to receive an emission signal 208 (e.g., scattering of signal 206) of the optical signal 208, and a characterization module 212 which is configured to received input from the optical source 204 and the optical receiver 210 and produce an object characterization 214, which characterized the surface shape (of body structure) of a partially fabricated object 202 as output.

The object 202 is shown schematically to be comprised of two materials: a base material 202a, for example a substantially transparent material through which the scanning optical signal 206 can freely pass or in which the signal is absorbed, and an optical brightener 202b which causes emission of the signal 208 (e.g., by scattering or fluorescence) in response to the scanning optical signal 206. Note that the optical brightener 202b is embedded in the bulk of the base material and not merely at the surface of the object 202. The scanning optical signal 206 is then shown to come into contact with an optical brightener 202b, whereby that coming into contact with one another produces a reflected optical signal 208. Portions of the scanning optical signal that did not come into contact with the optical brightener 202b become non-reflected optical signals (represented by 206a) and continue to pass through the object 202 without being received by the optical receiver 210. It should be evident that the characteristics of the emitted signal depend not only on the characteristics of the base material 202a and the additive material 202b, but on the concentration of the additive material. For example, the greater the concentration of the additive material, the greater the contribution of the emitted signal from near the surface of the object and the greater the strength of the emitted signal. Therefore, the selection of the concentration of the additive may depend on the achieved imaging characteristics.

Further referring to FIG. 2A, upon transmitting the scanning optical signal, the optical source 204 also communicates information characterizing the scanning optical signal 206 to the characterization module 212. For example, in some embodiments, the optical source 204 scans the signal 206 across the surface of the object and communicates a direction of the emitted signal to the module 212. In other embodiment, upon receiving the reflected optical signal 208, the optical receiver 210 communicates information characterizing the reflected optical signal 208 to the characterization module 212. For example, the optical receiver includes a two-dimensional sensor representing a field of view of the receiver and it communicates a location of a reflection in that field of view. After receiving the respective inputs from the optical source and the optical receiver, the characterization module produces an object characterization 214 based on its received inputs, for example, based on a geometry-based calculation. In some embodiments, the object characterization 214 may describe the surface of the object 202.

Figure 2B:
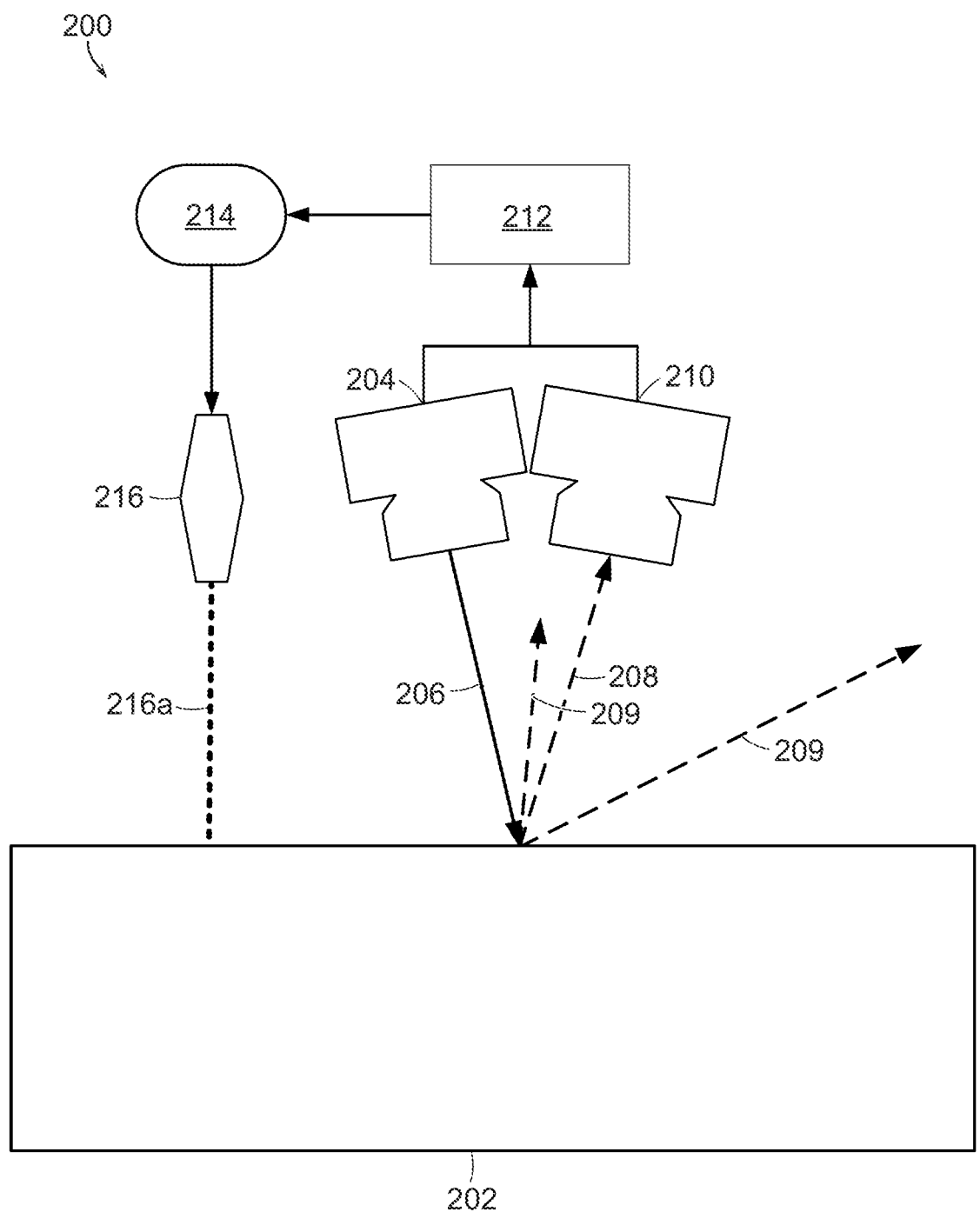

Referring now to FIG. 2B, the optical scanner 200 is shown in the context of a printing process. Here, the optical signal 206 produced by the optical source 204 is shown to disperse upon hitting the surface of the object 202, producing a reflected optical signal 208 and a dispersed optical signal 209. The inkjet 216 is shown to be controlled according to the object characterization 214 as input from the characterization module, and proceeds to use it to adjust its deposition of fabrication material. Specifically, the object characterization 214 that is ultimately produced as the result of the scanning facilitated by the optical source 204 and the optical receiver 210 is used to adjust the plan according to which the inkjet 216 deposits fabrication material 216a. In some embodiments, the inkjet 216 may modify its deposition of fabrication material 216a so as to correct an unforeseen defect that occurred during fabrication and was subsequently detected by the characterization module 212.

Figure 3:
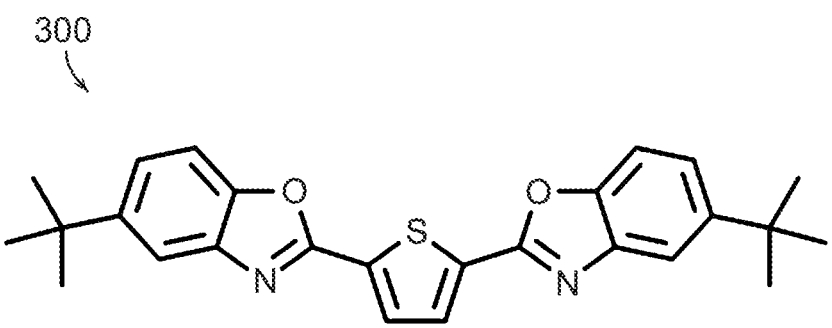
FIG. 3 is a chemical structure of an optical brightener in the thiophene class.
Figure 4:
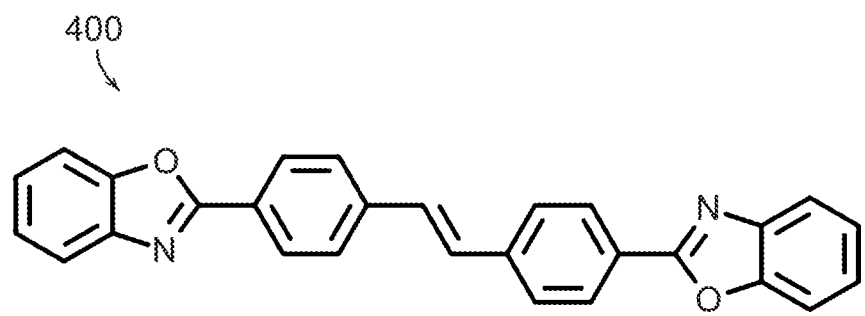
FIG. 4 is a chemical structure of an optical brightener in the stillbene class

Referring now to FIG. 3 and FIG. 4, exemplary optical brighteners belong to a class of molecules which are used in industries such as textiles, cosmetics, and papermaking to produce brighter white colors and mask yellowing. Most compounds used for optical brightening are in the stillbene or thiophene class. Examples of common optical brightening compounds are 2,2'-(2,5-thiophenediyl)bis(5-tert-butylbenzoxazole), also known by its trade name OB (300 in FIG. 3), and 2,2'-(1,2-ethenediyl)bis(4,1-phenylene)bisbenzoxazole, also known by its trade name OB-1 (400 in FIG. 4). These materials are typically soluble in UV curable resins at loading fractions less than 1%. Optical brighteners produce a whitening effect by absorbing ultraviolet and near-UV light and re-emitting it as blue light via fluorescence. By absorbing UV light that is invisible to the eye and re-emitting it as blue, the color profile of light coming from the sample surface is flattened. This reduces the yellow tint that is seen in many polymeric materials.

Figure 5:
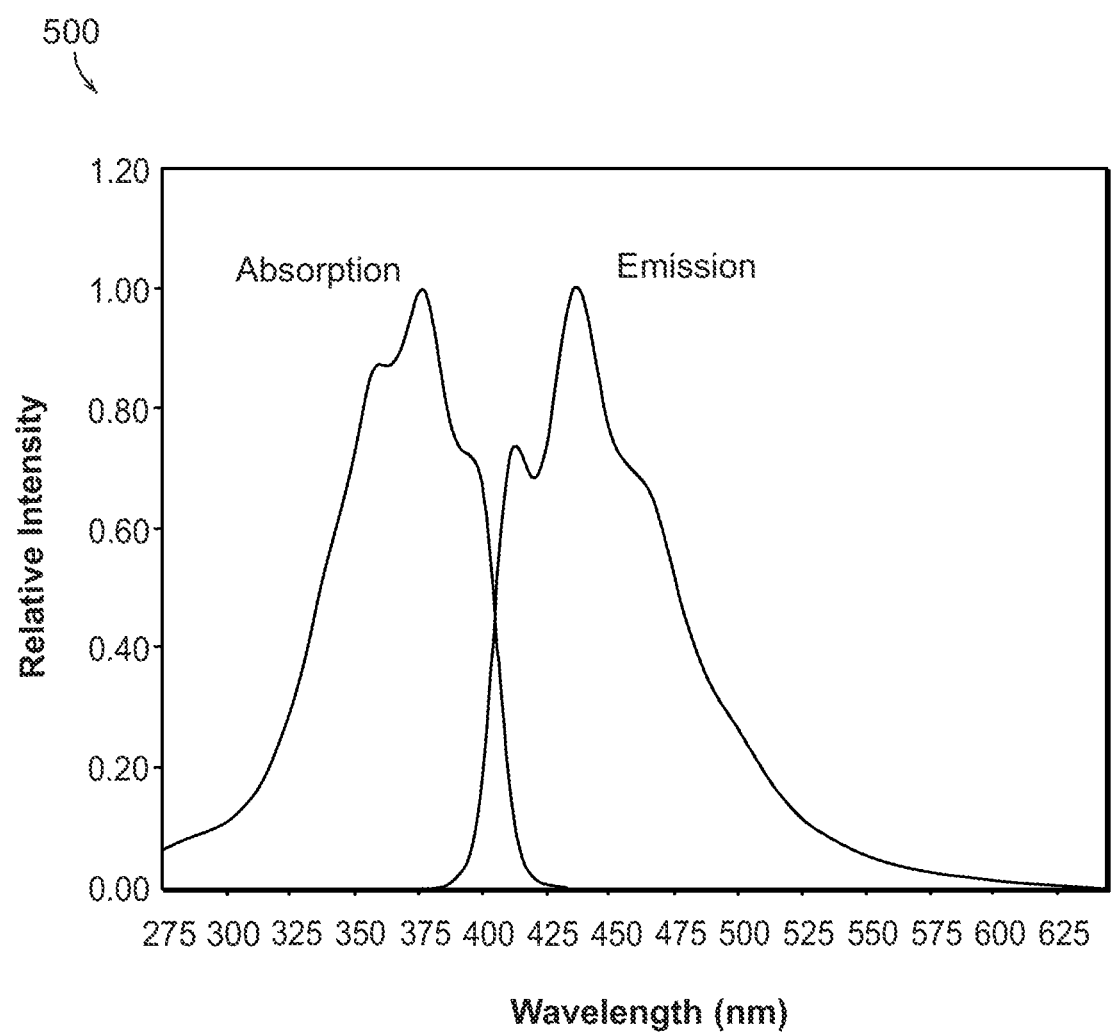
FIG. 5 is a graph of absorption and fluorescence spectra of an optical brightener.

Referring to FIG. 5, a graph describing the absorption and fluorescence (emission) characteristics of compound OB (300) is shown. UV curable resins are typically amorphous, transparent materials when in their cured form. This transparency applies to the 405 nm light source that is typically employed in laser profilometry techniques. This results in some of the laser light passing through the material until it reaches an opaque substrate, with the rest reflecting from the surface at an angle based on the part orientation. In this case, the detector will detect either the light scattering from the underlying substrate or the surface only if it is angled such that the spectral reflection directly reaches the detector. This produces a poor quality and unreliable surface scan.

Optical brighteners both absorb and fluoresce in the 405 nm region. This has two effects; the light is prevented from penetrating deep into the sample and scattering on the underlying substrate, and 405 nm light is emitted from the surface where the laser impinges on the sample in all directions. This guarantees that a sufficient intensity of 405 nm light will reach the detector given an appropriate amount of optical brightener. It has been shown that this is achievable at very low loading fractions as low as 0.02%. It should be recognized that it may be desirable to have the light penetrate at least some distance into the material, for example, by adjusting the concentration of the brightener or an absorbing component of the brightener, in order to sense characteristics of the object within such a distance from the surface.

The discussion above focusses on scanning to determine the surface of a fabricated structure. Note that in many situations for additive fabrication, a support structure of one material is deposited around the object being fabricated, with the printer being controllable to emit either support material or fabrication material during fabrication. Therefore, control of the location of transition from support material to build material is important for accurate fabrication. In the approach described above, the additive may be added to the build material and not to the support material, thereby enabling the detection from a region of support material to a region of build material. In yet other applications, there may be multiple different build materials, and different additives may be added to each material in order to yield different emitted optical characteristics. For example, different additives may have different fluorescence wavelengths, thereby enabling detection of a transition from one material to another according to a change in the scanned frequency of the emitted light. In yet other multiple material situations, variable ratio mixtures of multiple build material may be used, for example, to yield spatially varying mechanical characteristics, and a detected mixture of wavelength content in an emitted signal may indicate the physical mixture of the materials.

The embodiments discussed above are only examples, and more generally, alternative embodiments of the approach are formed as a combination of the following elements which may be independently selected to form different embodiments: (a) Manufacturing method; (b) Base materials; (c) Additives; (d) Detection enhancement mechanism; and (e) Machine vision method and corresponding software Manufacturing methods include additive manufacturing methods (e.g., where material is being added to build parts), including Selective Laser Sintering (SLS); Fused Deposition Modeling (FDM); Photopolymer Inkjet Printing; Three-Dimensional Printing (3DP); Laminated Object Manufacturing (LOM); Stereolithography (SLA). The approach can be applied to similar methods where material is being added (e.g., coating an existing surface, evaporation methods, etc.). The method can also be applied to subtractive processes where material is being removed (e.g., CNC milling). The approach can be also applied to mixed processes, where material is being both added and removed.

Base materials can be in various forms liquids or solids. Some of material types include: UV-curable resins (e.g., photopolymers), thermosets, thermoplastics, phase change materials. Some of UV-curable resins include: acrylates, thiol-enes, silicones, epoxies, vinyl esters. Some of thermosets include: rubbers, cyanate esters, furans, polyimides, polyurethanes, polyurea/polyurethane hybrids, bakelite, duroplast, melamine. Some of thermoplastics include: acrylic, abs, nylon, pla, polybenzimidazole, polyester, polycarbonate, polyether sulfone, polyoxymethylene, polyetherether ketone, polyetherimide, polyethylene, polyphenylene sulfide, polypropylene, polystyrene, polyvinyl chloride (PVC), polyvinylidene fluoride, Teflon. Materials can include reinforcements (e.g., different types of fillers). Metals and ceramics can also be used in this process. Solid materials can be in the form of an extrusion filaments (e.g., for FDM), powders/coated powders (e.g., for SLS, 3DP), sheets (e.g., for LOM), or material blocks (e.g., for CNC milling). Materials can also be in a liquid form: 1) any type of liquid that can be deposited (e.g., water, solvents); 2) any type of liquid that transitions from a liquid to solid form under UV, IR radiation (e.g., UV-curable resins, photopolymers, thermosets); 3) any type of liquid that transitions from a liquid to solid phase (e.g, waxes, plastics with relatively low melting temperature).

Additives ("brighteners") generally improve measurement signal of the corresponding machine vision/scanning system. In many cases it is desired that the additive material absorbs as little light as possible in the visible spectrum such that the overall material/part can be clear. It is often desired that the material significantly reflects/scatters light in the other part of the electromagnetic spectrum (UV, near IR, far IR, etc.). This reflection/scattering is typically tuned to the detection mechanisms. Some of the additives that may be used include: Small molecules: for example, fluorescent dies such as fluorescein, coumarin, Texas Red, Pacific Blue, Alexa Fluor series of dies commercialized by ThermoFisher Scientific. Polymers can be used, for example fluorescent and photoluminescent materials such as Poly(9-anthracenyl-methyl acrylate), Poly(fluorescein O-acrylate), and many other fluorescent polymers as described extensively in the Millipore-Sigma catalog. Metal complex dyes can also be used, such as 8-Hydroxyquinoline copper(II), 8-Hydroxyquinoline zinc, and many other compounds as described in the Millipore-Sigma catalog. Proteins can also be used, such as GFP (green fluorescent protein), RFP, YFP, mCherry, and the many photoactivatable, photoswitchable, photoconvertible and other proteins described in the Fluorescent Protein Database. Pigments can be used, such as Phthalocyanine green, Pompeiian Red. Other pigments include "cool roof" pigments which scatter strongly in the near IR while still giving selectable visible colors. Microparticles and nanoparticles can be used as additives. Metal nanoparticles, such as gold and silver nanospheres, gold nanorods, silver nanoplates, etc. can be used. One example of such particles is gold nanorods, which can be synthesized to scatter at the desired frequency, by tuning their length. Solutions of these particles are transparent in the visible spectrum, for example, with peak scattering at 660 nm or 990 nm. Metal-hybrid nanoparticles, such as silica shells with a metal core, can be used. Gold nanospheres coated with a silica shell can be used. Mesoporous nanoparticles may be useful because, due to their high surface-to-volume ratio, they can be loaded with large amounts of small molecules such as fluorescent dyes. Mesoporous silica nanoparticles (from nanoComposix) may be used. Magnetic nanoparticles, typically composed of iron oxides, exhibit superparamagnetic properties at ambient temperature. Such particles have a number of appealing properties, such as detectability by NMR. Quantum dots are semiconductor particles a few nanometres in size, having optical and electronic properties that differ from larger particles due to quantum mechanics. When illuminated by UV light, an electron in the quantum dot can be excited to a state of higher energy. In the case of a semiconducting quantum dot, this process corresponds to the transition of an electron from the valence band to the conductance band. The excited electron can drop back into the valence band releasing its energy by the emission of light. UV scattering particles can be used, An example of low toxicity UV scatterers is ivy-generated nanoparticles as described in Journal of Nanobiotechnology volume 8, Article number: 12 (2010) Li, Q., Xia, L., Zhang, Z. et al. Nanoscale Res Lett (2010) 5: 1487. Combinations of the additives described above can be used. For example, a combination of dyes and broadband scatters such but not limited to Titanium Dioxide and Zinc Oxide that tune color and scattering. These additives can be dispersed in the base materials (e.g., when the base material is a fluid). The additives can also be used as a coating (e.g, when working with powdered base materials, the additive can coat each base material particle). The additive coating can also be applied when working with sheets of materials (e.g., LOM).

Detection enhancement mechanisms can be used. In general, in at least some embodiments, the approach works with active 3D scanning approaches where the system directs light (or other electromagnetic radiation) toward the material to be measured. The light that returns from the material back to a detector (i.e., "emitted" from the material) is used to determine 3D information about the material. The material additives enhance the signal that is directed back to the detector by increasing the amplitude of the signal relative to the case with no additives. The detection enhancement mechanism might rely on scattering where atoms/molecules/particles exposed to light absorb light energy and re-emit light at the same wavelength in different directions. The light might scatter multiple times before reaching the detector, referred to as multiple-scattering. The mechanism may involve fluorescence which describes the emission of light by a substance that has absorbed light or other electromagnetic radiation. Typically, the emitted light has a longer wavelength than the absorbed radiation. One example of fluorescence is when the absorbed radiation is in the UV while the emitted light is in the visible region. The mechanism may involve luminescence, and particularly chemiluminescence, the emission of light from a chemical reaction, as well as other forms of luminescence. Yet another mechanism involves specular reflection which describes light directly reflected from the surface. Yet other mechanisms involve attenuation such that the level and/or spectral content of a signal reflects the presence of the additive (or the amount or concentration of the additive) and the detector measures the characteristics of the emission to infer the characteristics of the additive present in the material.

Machine vision method and corresponding software can include active scanning systems, where the system emits electromagnetic radiation (e.g., UV, visible, near IR, IR) and then measures (directly or indirectly) radiation which has been directed back to the detector by the part to be measured. The corresponding approach works with the following scanning methods: Triangulation scanning/profilometry; Time-of-flight imaging (pulse based and phase-shift); Active stereo methods/multi-baseline stereo/structured light; Active depth from focus/defocus; Interferometry; Optical coherence tomography; Shape from polarization; and Shape from heating. Yet other methods of active 3D scanning methods are also possible. Note that if only one type of additive is used then a monochromatic detector is sufficient, while if multiple additives with different spectra are used, multi-spectral detectors (e.g., color cameras) can be used to distinguish the different additives.

It is important to note that since the additives are below the surface of the scanned object, most measurement methods have a bias. That is, they measure locations of points below the surface. In order to compute the location of the surface, this bias may be estimated, and measurements compensated. When using profilometry-based scanning setup (also ToF, OCT, etc.) to scan translucent materials (or materials with scattering), there is typically a measurement bias. For example, the peak value recorded by the detector does not correspond to the actual surface but to some point below the surface. This can be remedied using the following approach. The bias value is estimated and then the recorded 3D scan positions are corrected. Typically, one can compare a material sample that is not translucent (e.g., coated with a thin reflective layer) with a sample that is translucent. The bias can be estimated as the depth difference between these two locations. The 3D scanning setup may be optimized in view of some geometric configurations working better than others. For example, when the light source/projector aligned with the surface normal minimizes the bias. The materials may be optimized, for example, recognizing that adding more additives (e.g., optical brightener, pigments) typically reduces the bias.

When fabricating an object using multiple materials (e.g., multiple build materials and support material) it is important to estimate the bias for each of these materials such that the corresponding depths can be accurately computed. This process is the easiest if the concentrations of the additive is adjusted such that the bias value for each of the materials is approximately the same. Then the same bias value can be used to adjust the depth of each sample. If the bias is different for each material type, then first we need to estimate which type of material is present at a given point and then apply the corresponding bias value. Material type detection can be done difference is spectral measurements.

Furthermore, it should be recognized that there are many modes of exciting the additive, some of which are discussed above. For example, light may be directed to the material form a laser, liquid crystal display projector, etc., and such light may be visible, or outside the visible range (e.g., ultraviolet). In some example, the excitation is a radio frequency signal. In some examples, the excitation is passed through the body of the object (e.g., from below) causing excitation such as fluorescence in the body of the object. In yet another mode of excitation, a chemical reaction caused by combining materials shortly before deposition may cause luminescence for a limited time, and this luminescence is scanned to determine the object characteristics.

Various types of additives may be used, including small molecule, macromolecule, supramolecular aggregate, protein, polymer, quantum dots, metal nano and micro particles (such as gold and silver nanoparticles, nanorods or nanoplates), non-metallic nano and microparticles (such as silica, zeolites, mesoporous particles, etc.) pigments, fine powder dispersions, etc. Another alternative additive includes a dye that degrades at a known rate under UV light exposure, so that it is only visible in the most recently deposited layer. The intensity at each point can be used to extract a depth map of the newly deposited layer. Upon subsequent exposure to the UV light during the 3D printing process from the successive layers, the dye will degrade and will not be visible when the product is in functional use. Another example uses OCT (Optical Coherence Tomography), which yields depth data and not merely a surface map. In the OCT case, the additives preferable enhance coherent scattering as opposed to scattering due to fluorescence. In yet another alternative, specific molecules are mixed within the fabrication material to determine whether polymerization has fully occurred. In this case, a determination would mean to assess whether the layer is fully cured, or if it needs an additional pass with UV light. In the life sciences literature for example, there are many fluorescent dyes that can be used to detect the presence of reactive oxygen species for example, unreacted monomers, as well as dies that can be used to determine the presence of other molecules. As an example, this catalog page from Thermo Fisher lists the fluorescent dies available for detecting ROSs. In general, additives may be used to detect the state of polymerization of a material during printing, and whether unwanted byproducts have been formed during UV light exposure. Such sensing is all part of determining whether the production process is proceeding correctly, but they extend beyond completeness, and even geometrical correctness. Of course it should be recognized that multiple additives may be combine to provide different types of emissions, for example, with some related to a degree of curing and others used to determine the surface or body structure of the object being fabricated.

There are a variety of alternative physical principles that may be used to extract information about surface geometry, depth, degree of polymerization, or any other physical or chemical property that is relevant to the object to be fabricated. These include using scattering, fluorescence, absorption, fluorescence lifetime imaging, confocal imaging, and many other methods.

Pure absorption can also be used, so that rather than brightening a response, the amount of the additive reduces the emission. Therefore "brightener" should be understood broadly merely to be a material that alters emission that may be sensed. Also, may be desirable that the emission not be visible to the human eye (in order to maintain the desired color or transparency of the fabricated object) but be visible to the detector, by using molecules that absorb in the UV region and emit in the visible, or for example gold nanorods that scatter only in the infrared region but are not visible to the human eye. As an alternative to adding different enhancers in the same material, adding a complex brighteners that, within themselves, contain different molecules that, acting together, perform some specific function. For example, it is possible to load fluorescent molecules within mesoporous silica nanoparticles of sizes in the range of 10-500 nm.

The sensor for detecting the emission may be a camera, and may include a photomultiplier to enhance the response to the emission from the object. The methods used for data collection and interpretation may include linear readout, ratiometric imaging, multispectral imaging, etc. It should be understood that in various embodiments, the scanning is not limited to determining the surface geometric structure of the object. Structure of the body of the object (e.g., near the surface) as well as properties such as material, material combination (including ratios), degree of curing, etc. can equivalently be determined.

Note that as introduced above, the concentration of an additive may affect the properties of the emitted signal. For example, at a low concentration, due to scattering from a range of depths near the surface of the material, the accuracy of the surface measurement and/or the accuracy of the transition point from one build material to another or to a support material may be lower than at a higher concentration. Therefore, it is possible to select and/or modify the concentration, possibly varying over the surface of an object being fabricated, to achieve desired scanning characteristics depending on the features that need to be measured.

Furthermore, note that because the scattering or other emission phenomenon results from interactions below the surface of the material, the incident light signal will in general interact with multiple deposited layers of the material. In order to scan only recently added material a differential scanning technique may be used in which the emissions are detected before the adding material (e.g., one or more layers of material deposit) as well as after adding the material, and then a difference in response is used to measure the properties of the added layer.

As introduced above, an additive may be added to the build material at many different points in the process. For example, the additives may be incorporated into the build material well before use, for example, with the build material being sold in an optically enhanced form. The additive material may be distributed separately from the build material, and added to bulk build material in a desired concentration in storage containers, for example, at a 3D fabrication facility. The additive may be added in a "just-in-time" manner in the printer mechanism, for example, as illustrated in FIG. 1 where there is control over the combination process in the printer, thereby enabling techniques such as concentration variation across the object.

In at least some embodiments, a controller coordinates operation of a printer, for example, causing the incorporation of optical enhancers and processing scans the take advantage of the emissions from the enhancers. The controller may be implemented in software, which may be stored on a non-transitory machine-readable medium, and which when executed by a processor causes the controller to perform the steps of procedures described above. In some embodiments, the controller may be implemented in hardware, for example, using application-specific integrated circuits or field programmable gate arrays.

It is to be understood that the foregoing description is intended to illustrate and not to limit the scope of the invention, which is defined by the scope of the appended claims. Other embodiments are within the scope of the following claims.

What is claimed is:

1. A method for additive manufacturing including
   forming an object, including depositing a material in an additive fabrication process to form the object, the material including a build material component and an optical enhancement component;
   scanning the object, including
      causing emission of an optical signal from the object, wherein the emission of the optical signal is caused at least in part by emission from the optical enhancement component,
      sensing the emission of the optical signal, and
   determining at least one property of the object from the scanning of the emission,
   wherein causing emission comprises causing scatter of an incident optical signal from the optical enhancement material component.

2. The method of claim 1, further comprising controlling further depositing of the material on the object according to the determined at least one property of the object.

3. The method of claim 1, wherein the emission of the optical signal is caused at least in part by a transient chemical process.

4. The method of claim 1, wherein the scanning of the object includes using a laser profilometry technique.

5. The method of claim 1, wherein forming the object includes deposition a plurality of materials, each material including a different optical enhancement component, and wherein scanning the objects includes distinguishing materials of the plurality of materials according to different emission characteristics of the different optical enhancement components.

6. The method of claim 1, wherein determining the at least one property of the object includes determining a surface profile of the object.

7. The method of claim 1, wherein forming the object comprises depositing an additional material and wherein determining the at least one property of the object includes detecting a transition between the materials that comprise the object.

8. The method of claim 1, wherein forming the object comprises depositing an additional material and wherein determining the at least one property of the object includes determining a concentration of at least one of the materials that comprise the object.

9. The method of claim 1, further comprising selecting a concentration of the optical enhancement component in the material.

10. The method of claim 1, wherein the material has less than 1% optical enhancement component by weight.

11. The method of claim 10, wherein the material has less than 0.1% optical enhancement component by weight.

12. The method of claim 1, wherein the build material component comprises visible light curable resin.

13. The method of claim 1, wherein the property is indicative of a geometric structure of the object.

14. The method of claim 1, wherein depositing the material comprises depositing a transparent material.

15. The method of claim 1, wherein depositing the material comprises depositing a printable resin that comprises a mixture of pigments and dyes.

16. The method of claim 1, wherein determining the property comprises determining a surface geometric structure.

17. The method of claim 1, wherein scanning the deposited material with an incident optical signal comprises scanning with structured light.

18. The method of claim 1, further comprising combining the build material component and the optical enhancement component to form the material.

19. The method of claim 1, further comprising controlling a proportion of the build material component and the optical enhancement component based on a material specification.

20. The method of claim 1, further comprising causing the optical enhancement component to be embedded in the bulk of the build material component.

21. The method of claim 1, wherein scanning the deposited material with an incident optical signal results in portions of the incident optical signal passing through the object.

22. The method of claim 1, further comprising forming a support structure for the object while forming the object, wherein forming the support structure comprises depositing a support material around the object and detecting a transition between the support structure and the object based on a difference between the optical properties of support material and the material from which the object is formed.

23. The method of claim 1, wherein depositing the material comprises depositing a clear material that reflects light whose wavelength differs from those of visible light.

24. The method of claim 1, further comprising selecting the optical enhancement component to be titanium dioxide or zinc oxide.

25. The method of claim 1, further comprising estimating a bias caused by the presence of the optical enhancement component below the surface of the object and compensating for that bias based on the estimate.

26. The method of claim 1, wherein sensing the emission of the optical signal includes sensing scatter from the optical enhancement material and wherein determining the at least one property of the object includes determining said at least one property from the sensing of the scatter from the optical enhancement material.

27. The method of claim 1, wherein the optical enhancement material component that causes scatter of the incident optical surface lies below the surface of the object.

28. A three-dimensional printing system, comprising:
 a proportion controller that receives a material specification;
 a material combiner comprising a first input for receiving a build material component and a second input for receiving an optical enhancement component, the material combiner being configured to combine the build material component and the optical enhancement component based in a proportion specified by a signal from the proportion controller, the proportion having been specified by the material specification;
 a material deposition subsystem configured to controllably deposit a material provided by the material combiner in a liquid state to form an object, the material including the build material component and the optical enhancement component;
 a scanning system configured for causing emission of an optical signal from the object, wherein the emission of the optical signal is caused at least in part by interaction of an excitation signal with the optical enhancement component in the object, the scanning system being further configured to sense the emission of the optical signal, and to determine at least one property of the object from the scanning of the emission; and
 a controller configured to control further material deposition by the material deposition subsystem according to the determined at least one property of the object.

* * * * *